(12) United States Patent
Ayyagari et al.

(10) Patent No.: US 8,468,252 B2
(45) Date of Patent: Jun. 18, 2013

(54) SELECTING OPTIMAL TRANSMISSION IN A CENTRALIZED NETWORK

(75) Inventors: Deepak Ayyagari, Vancouver, WA (US); Tomohiko Ozeki, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1106 days.

(21) Appl. No.: 10/404,953

(22) Filed: Mar. 31, 2003

(65) Prior Publication Data

US 2004/0064508 A1    Apr. 1, 2004

Related U.S. Application Data

(60) Provisional application No. 60/414,149, filed on Sep. 26, 2002.

(51) Int. Cl.
*G06F 15/16* (2006.01)
(52) U.S. Cl.
USPC ............ 709/227; 709/228; 709/232; 370/252
(58) Field of Classification Search
USPC .................. 370/252; 709/220, 223, 227, 228, 709/232
See application file for complete search history.

(56) References Cited

U.S. PATENT DOCUMENTS

| | | | | |
|---|---|---|---|---|
| 5,982,778 | A * | 11/1999 | Mangin et al. ................ | 370/252 |
| 6,480,480 | B1 * | 11/2002 | Du ................................ | 709/239 |
| 6,687,753 | B2 * | 2/2004 | Schneider ..................... | 709/235 |
| 2002/0085503 | A1 * | 7/2002 | Hulyalkar et al. ............ | 370/252 |

OTHER PUBLICATIONS

Maria Yuang, Bird Lo, and Ju-Ya Chen, "A Perfectly Stable Contention Access Scheme for Wireless Access Networks", 2001, Vehicular Technology Conference, IEEE VTS 54th, vol. 4, pp. 2163-2167.*

* cited by examiner

*Primary Examiner* — Aaron Strange
(74) *Attorney, Agent, or Firm* — Marger Johnson & McCollom, P.C.

(57) ABSTRACT

A method of determining a transmission process is disclosed. One embodiment comprises a method of notifying a central coordinator of a group to receive a transmission and obtaining system parameters from the central coordinator. The method then determine at least one merit parameter using at least one of the system parameters and at least one local parameter and selects a method of transmission based upon the merit parameter.

16 Claims, 8 Drawing Sheets

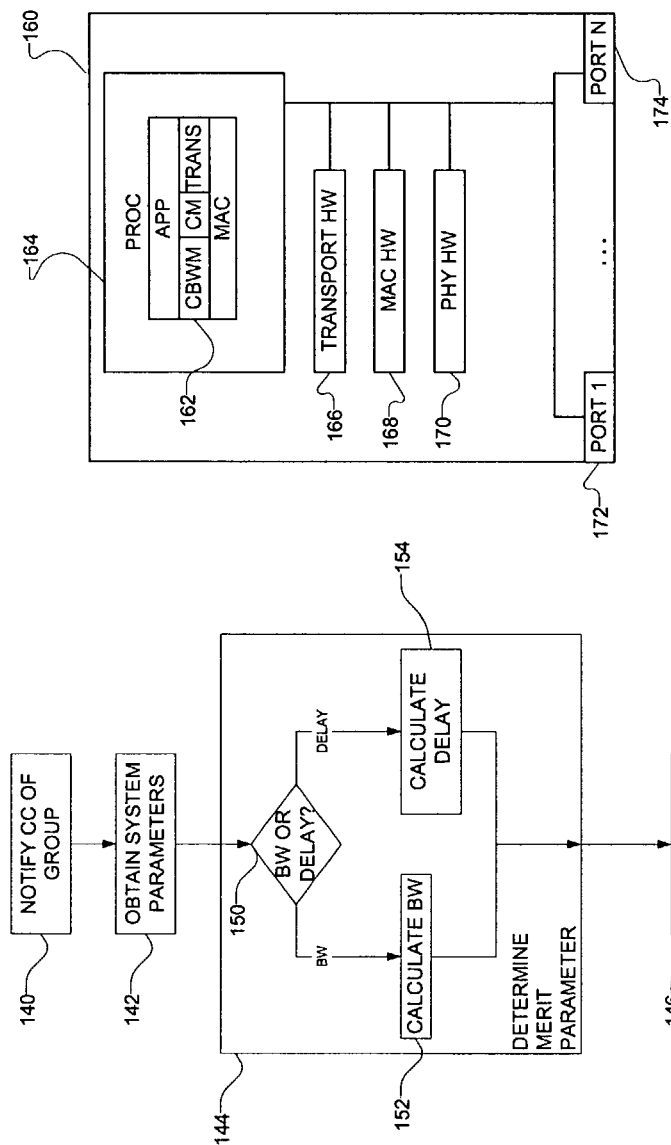

SELECTING OPTIMAL TRANSMISSION IN A CENTRALIZED NETWORK

RELATED APPLICATION

This application is a continuation of U.S. Provisional Application No. 60/414,149 filed Sep. 26, 2002 and claims priority thereto.

FIELD

This disclosure relates to a point-to-point and/or point-to-multipoint networks with a centralized controller, more particularly to methods to allow broadcast and multicast in such networks.

BACKGROUND

Some networks have a centralized controller that provides scheduled point-to-point communications, and may also coordinate a contention channel. These networks may also allow point-to-multipoint communication links between devices, but only of limited capacity. These types of networks will be referred to as centralized networks. In contrast, networks that have a shared medium, such as those having a broadcast channel, or those that have no centralized controller, such as Internet Protocol (IP) networks or other distributed networks operating by an agreed-upon standard.

In centralized networks, communications between devices are generally scheduled and controlled by the central controller. If device A needs to send something to device B, device A must either send the communication to the central controller, which then sends it to device B, or device A must send a message to the central controller indicating the desire to send something to device B. In the latter example, the central controller then notifies all of the devices on the network to stay off the network at a certain point in time, as device A will be allowed to send the communication to device B at that time. Some systems may support a contention access channel, a first-come-first-served channel access for which the devices contend.

Because of the point-to-point nature of these systems, as well as the need for a centralized controller, there are no current methods to allow for broadcast or multicast messages in these systems. A broadcast message is one sent to all devices on the network, while a multicast system is one sent to a specified subset of the network. Centralized networks may have the ability to send point-to-multipoint messages, which are in essence a multicast message, but the capabilities are limited.

BRIEF DESCRIPTION OF THE DRAWINGS

The invention may be best understood by reading the disclosure with reference to the drawings, wherein:

FIG. 7 shows a flowchart of a method to determine a transmission process.

FIG. 8 shows a block diagram of one embodiment of a central coordinator for a centralized network.

DETAILED DESCRIPTION OF THE EMBODIMENTS

As used here, the term 'centralized network' will be used to refer to networks having a central device called the Central Coordinator to control bandwidth allocation to all devices within the network. A data communication network using power line networks that exist in homes and buildings would be one example of such a network. However, the methods and apparatus disclosed here are relevant to any network that have a centralized architecture with a central coordinator controlled the activity of devices in the network.

A centralized network has two different types of entities, devices and a central coordinator (CC). Any device can function as the central coordinator provided it has the required capabilities. The process of determining which device in the network functions as a central coordinator is beyond the scope of this discussion. In the specific example of a power line network (PLC), the devices, such as TVs, VCR, Computers, set-top boxes, home-audio equipment, etc., communicate with each other via the network of power lines in the building or home. However, other types of centralized networks exist and may utilize embodiments of this invention. The use of a power line network is only intended to aid in understanding of the invention.

Figure 1:
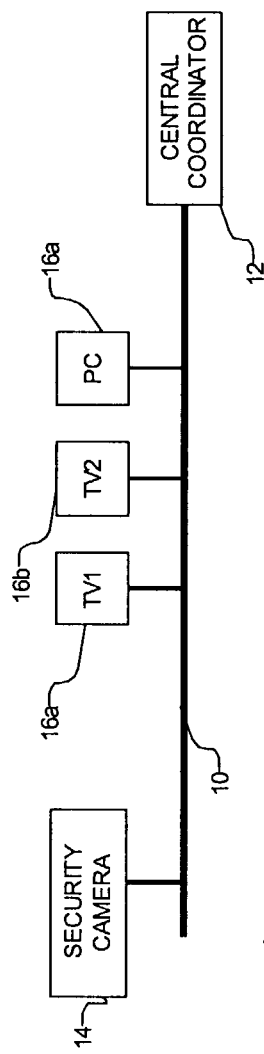
FIG. 1 shows an example of a centralized network.

An example of such a power line network is shown in FIG. 1. All of the devices on the network are connected through the power lines in the home, which form the power line network 10. A central coordinator controls the access to, and use of, the network for communications. In this particular example, a security camera 14 at the front door transmits video data across the PLC 10 to the destination devices 16a, a first television, 16b, a second television, and 16c, a personal computer. In this particular example, the security camera is the source device and the TVs and the PC are the destination devices. Currently, the source device transmits the data by specifically identifying each destination device to the central coordinator 12 and setting up three individual channels to transmit those images. This is not a very efficient design for a broadcast/multicast telecommunications system.

The design of telecommunications systems has traditionally been based on the Open Systems Interface (OSI) specification prescribed by the International Standards Organization (ISO). The OSI model proposes a partitioning of functions of devices into 7 distinct protocol layers. Though the exact definition of these layers is open to interpretation they represent a useful framework in which to discuss system functionality. The 4 main layers of interest in a PLC system are the Application Layer, Transport Layer, Medium Access layer and the Physical Layer.

The Application Layer includes both IP (Internet Protocol) and non-IP based applications. Applications examples include Video such as High Definition Television (HDTV) and Standard Definition Television (SDTV), High quality audio, IP applications with Quality of Service (QoS) and other applications. Many of these applications require that the network posses some broadcast/multicast capabilities. An example would be Address Resolution Protocol (ARP) broadcasts in IP.

In an ARP broadcast, a first host is attempting to discover the physical address of a second host, for which the first host has an IP address. The first host sends out a broadcast, which all devices on the network receive. The second host with that IP address then replies with its physical address. In order for that type of discovery to work, the network must support broadcast capabilities.

The Transport Layer consists of the protocols and methods that are responsible for peer-peer transport of application data between devices. The chief function of the Transport Layer is the definition of logical communication links or connections between peer entities and management of the connection, including defining quality of service (QoS) parameters for application data and monitoring/enforcing the QoS parameters such as the average and maximum delay tolerable for each packet transmitted on the connection, bandwidth (BW) required, etc. The transport protocol in a PLC is essentially a connection-oriented protocol as opposed to a packet oriented or connection-less protocols. Connections are defined to carry application data or control data between peer-peer entities in the networks.

The Media Access Control (MAC) Layer provides functions required by the Transport System such as acknowledgements for reliable packet delivery, in-sequence packet delivery, multiplexing of connections, concatenation and fragmentation of packets, etc. These functions will be used at the discretion of the Transport Layer manager. The physical (PHY) layer involves the digital signal processing systems for digital transfer of packets between devices. For the purpose of understanding embodiments of this invention, the discussion here is concerned only with a dual frequency-time division multiple access MAC/PHY protocol that organizes time into units called Frames and sub-units called slots and has a set of frequencies or "carriers" to assign to devices in a particular Frame/slot. One such MAC/PHY protocol is OFDM or Orthogonal Frequency Division Multiplexing.

In an OFDM system, the central coordinator assigns bandwidth to the devices by determining the Frames/slots in which each device is permitted to transmit. The central coordinator also determines what frequencies/tones the device uses during the assigned slots as well as digital communication parameters such as modulation density or number of bits/symbol. This information is called an Allocation.

Several definitions for terms as used here will be helpful. As used here, a device is a complete entity, having a full protocol stack as set out in the OSI model. A central coordinator is a specialized device within the network that maintains network timing, frame structure, network identity and allocation of bandwidth to connections. In addition, the central coordinator has a central bandwidth manager (CBWM) as well as other typical device functions. The central coordinator is a central repository of information and has global knowledge of all connections and bandwidth allocated to each of these connections.

The CBWM is a function in the central coordinator that is responsible for the allocation and management of Frequency and Time assignments to channels or connections. A connection is a bi-directional channel between two devices, which is uniquely identified by its Connection ID. A broadcast application is an application whose data is transmitted from a single source device to all devices on the network. Similarly, a multicast application is an application whose data is transmitted from a single source to a select subset of destination devices on the network.

The communication links between the different devices in the network are called "channels". Connections or logical traffic channels between peer-peer Transport Layers may use one or more channels. It is assumed that the network provides for such channels between devices in the network and between devices and the Central Coordinator (CC). For purposes of this discussion, four different channel types will be used: dedicated channel (D-CH), traffic channel (T-CH), beacon channel (B-CH) and the contention channel (C-CH).

The dedicated channel is used for communication between a device and the central coordinator. This channel is established when a device first joins the network and stays alive for as long as the devices stays active in the network. Within each frame, time slots and frequency tones are reserved for a D-CH from every device to the central coordinator and from the central coordinator to every device.

Typically, the D-CH is a low bandwidth point-to-point bi-directional link. The devices know the bandwidth allocated to the Dedicated Channel before the broadcast/multicast actually takes place. This means that the bandwidth allocated to the D-CH is known at the time the D-CH is originally established which is usually right after the device has registered with the central coordinator and has been authenticated and admitted to the network. The bandwidth of the D-CH is usually fixed right from the start, though this bandwidth can be changed by the CC. The D-CH is assumed to be a non-blocking channel where packets are queued if the D-CH is busy. The D-CH is also assumed to allow the data packets access to the D-CH when needed.

The contention channel (C-CH) uses all frequency tones in order that all devices can listen to it. Devices contend for the right to transmit on this channel. An example of a contention access protocol is Slotted ALOHA random access. Devices can use this channel on a first-come-first-served basis. The central coordinator may advertise the bandwidth allocation (frequencies and times frames/slots) for a contention channel. Optionally, the central coordinator might also inform devices of the load on the Contention Channel. The C-CH is a point-multipoint channel. In a multi-tone system where the channel characteristics of the communication link between any two devices can vary considerably, the modulation used on the C-CH has the least spectral efficiency in order to allow all devices to receive the transmissions successfully. This adversely affects the overall throughput if this channel is used for data traffic.

The central coordinator uses the beacon channel (B-CH) to periodically transmit network information and data. This channel uses all frequencies/tones in order that all devices can listen to it. Therefore, the spectral efficiency of the transmissions on this channel has to be of the lowest order as explained in the case of C-CH. This is a very low bandwidth unidirectional, point to multi-point channel used only by the CC. The bandwidth of the B-CH is fixed, as are most of the messages that use this channel. The use of B-CH therefore is primarily reserved for acknowledgements and not for application data transport.

Traffic channels (T-CH) are scheduled by the central coordinator for peer-peer communications in which a device can transmit data to another device. The central coordinator might also schedule a traffic channel with the central coordinator as the source. Traffic channels are established through an exchange of a request and response messages on the Dedicated Channel between the central coordinator and the device. Each traffic channel is bi-directional and has a bi-directional "allocation" in terms of frequencies and time frames/slots. Only the device assigned the channel can transmit using this channel i.e. the allocation is dedicated to use by a single pair of devices.

Traffic channels can be point-point or point-multipoint channels. Since the channel characteristics between the source and destination devices on a traffic channel are estimated through the process of channel sounding, the spectral efficiency of the digital modulation on T-CH can be considerably higher than C-CH or B-CH. This enhances overall throughput. T-CHs can be very high bandwidth channels as the central coordinator has the flexibility to allocate any of the available bandwidth to the channel.

In determining how to do broadcast/multicast in such networks one must consider all the channel structures available within the network. Each of the communication channels described earlier has its limitations and positive attributes. Dedicated channels are fixed low bandwidth links but they are always present and hence eliminate the delay associated with a request-grant channel set-up procedure. Contention Channels do not need a request-grant procedure for channel set-up and have low delay characteristics, provided there are few users contending for access to the channel. However, Contention Channels in systems such as OFDM have to operate at the lowest modulation (bits/symbol) possible in order for successful transmission of messages to all devices. This reduces efficiency of utilization of the available spectrum or throughput. Further, if the probability of collisions increases, bandwidth is wasted and delay increases considerably.

Traffic channels are efficient for point-point communications. For point-multipoint operation traffic channels require a request-grant bandwidth allocation procedure that must also determines the right modulation and other physical channel parameters to enable communications from one source to many destinations. Whenever a channel such as C-CH or B-CH or a T-CH with all frequency tones is used for broadcast, the modulation density that is used is typically the lowest possible, so as to allow all devices to receive and decode the packets correctly. This reduces throughput, increases delay and decreases the efficiency of spectrum utilization.

Figure 2:
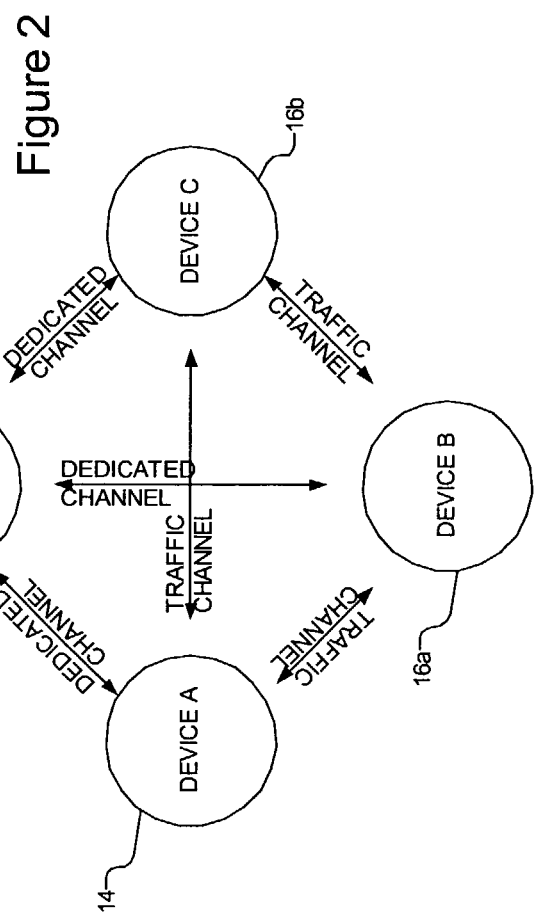
FIG. 2 shows an example of channels in a centralized network.

A diagram of channels used in a power line communication system such as that of FIG. 1 is shown in FIG. 2. The central coordinator has a dedicated channel between it and all three devices, the source device A and the destination devices B and C. A traffic channel is set up between each device and the other devices. The designation of device A is only transitory and lasts only as long as A is transmitting data.

Figure 3:
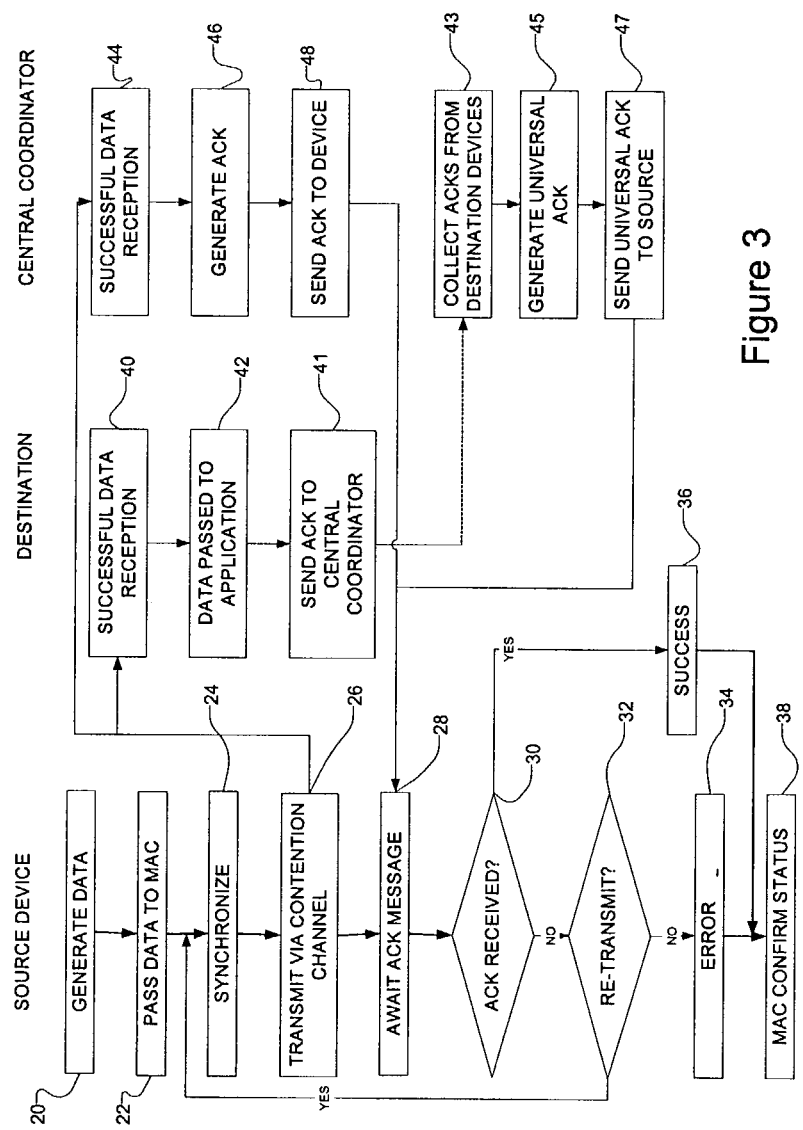
FIG. 3 shows a flowchart of a method of transmitting data in a centralized network.

A first embodiment of a method for transmitting data is shown in FIG. 3. This embodiment will be referred to as the contention access method. In this method, the source device uses the Contention Channel to transmit to all devices in the network. The use of C-CH allows the device to eliminate delay associated with a request-grant mechanism required for scheduled channels like the Traffic Channel. The C-CH also allows the source device to reach all devices in the network.

In FIG. 3, the flowchart is arranged so processes done by each entity in the data transaction are identified as the source device, the central coordinator or the destination. For this method, the focus is mainly on the source device. An application, typically running on the source device, generates the data to be broadcast to all devices in the network at 20. Alternatively, the source device may identify a multicast set of destination nodes.

The application passes the data to be broadcast/multicast to the Transport/MAC Layer at 22. The MAC Layer achieves frequency and time synchronization of the Frame and determines the position of the contention channel within the Frame at 24, typically by listening to the Frame format broadcast by the central coordinator on the B-CH. The source device transmits the data over C-CH to the designated devices on PLC network at 26, and waits for an acknowledgment at 28.

When the central coordinator receives the data over the contention channel, it acknowledges the successful reception of data 44 through an ACK message generated at 46 that includes the equipment identifier of the source device. The ACK is transmitted at 48 over the B-CH, or the D-CH if it exists between the source device and the CC. This provides a degree of robustness to the C-CH transmissions since source device knows that at least one of its transmissions was successful at 36 and it is likely the others were too, such as that shown at 40. If the data were successful received at the destination device at 40, the data would then be passed to the appropriate application running on the destination device at 42. This scheme does not guarantee delivery to all devices on the network or in the multicast group. Alternate acknowledgement schemes may possibly be used.

If the source device sends the data over the C-CH but it is not received successfully by the CC, no acknowledgment will be received at 30. The source device may use a 'back off' algorithm to determine the next time it will attempt the re-transmission and try to transmit the same data again at 32. The source device can choose to re-broadcast the packets multiple times up to a maximum retransmit count. The device can also use timers to stop the re-transmissions once the timer expires. The timer may use Time to Live/Die values attached to the data packets if the system requires that this information be specified for all data.

In an alternative embodiment, the destination devices all respond with an acknowledgement to the central coordinator at 41. The central coordinator then collects all of the acknowledgements at 43. The central coordinator is aware of all of the devices that were in the group designated at 26. The central coordinator will generate a universal acknowledgement at 45, based upon the group. This may occur if all of the designated devices respond with acknowledgements, or if no response is received from all devices within a predetermined period of time. The universal acknowledgement is a list of all acknowledgements and negative acknowledgements (NACKs). The source device then uses this information in the decision at 32.

If the source device does not re-transmit the data at 32, the process records an error in transmission at 34. If the source device does decide to re-transmit the data at 32, the process returns to the synchronization at 24. At 38, the MAC layer informs the application of either success or failure.

Figure 4A:
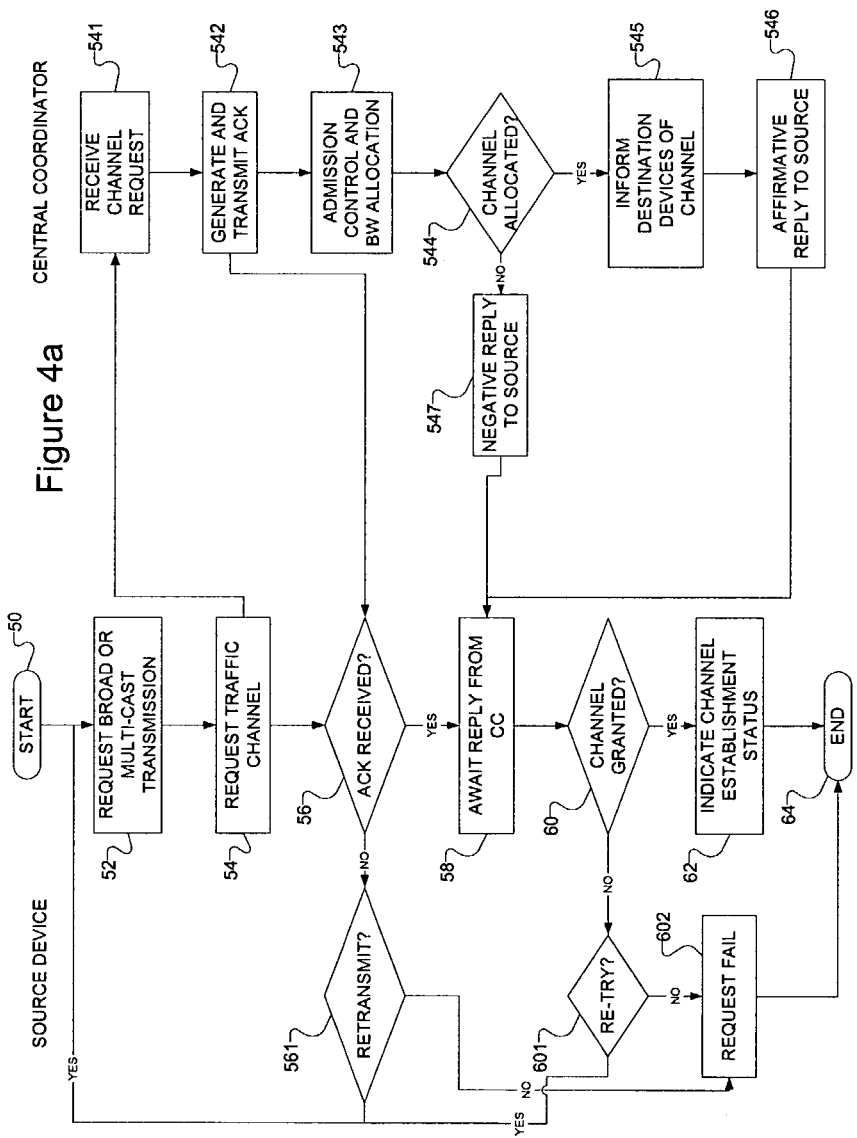
FIGS. 4a-4c show flowcharts of embodiments of methods to establish a channel for transmitting data, to transmit data in a centralized network and to release the channel.
Figure 4B:
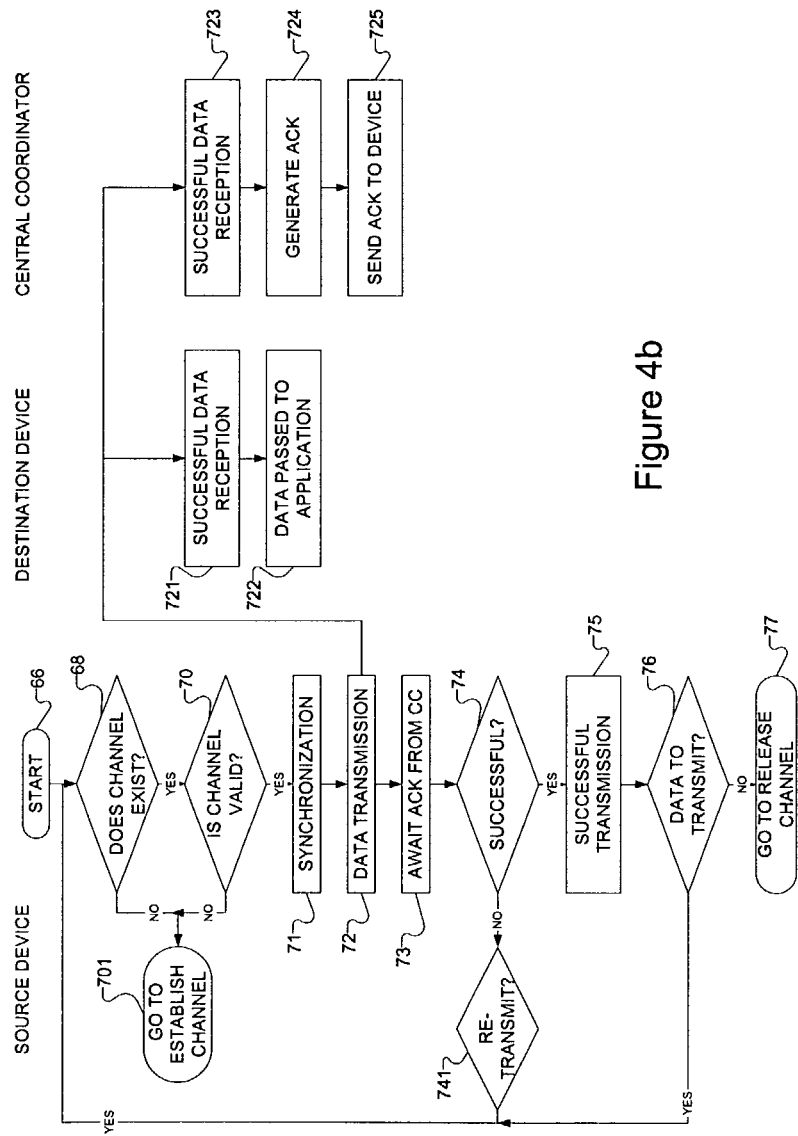
Figure 4C:
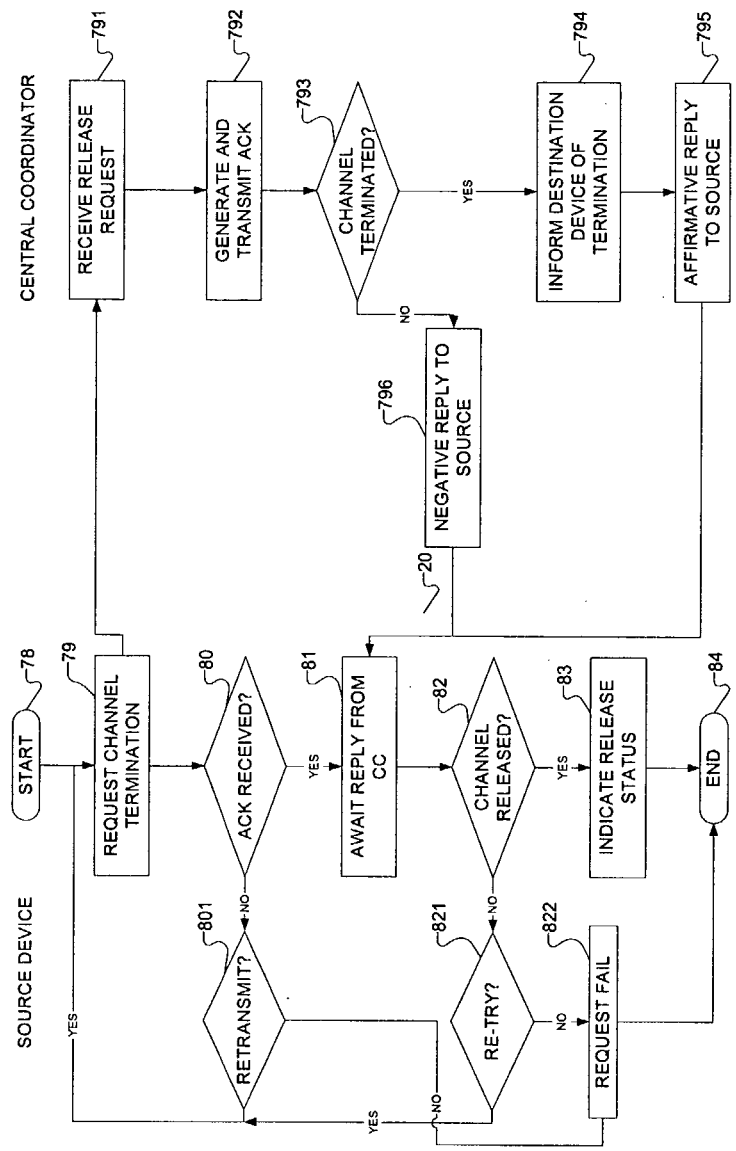

Portions of an alternative method for transmitting data are shown in FIGS. 4a-4c. In this method, the device explicitly requests the central coordinator for the establishment of a point-multipoint T-CH and will be referred to here as a direct broadcast method. The focus is again mainly on the source device. The request-grant exchange between the central coordinator and the source device occurs on the D-CH. The source device may use C-CH also for sending requests upstream to the CC. This method had three phases: establishing the T-CH, transmitting data on the T-CH, and releasing the T-CH.

An embodiment of establishing the traffic channel is shown in FIG. 4a, for situations in which no traffic channel exists. The process starts at 50. At 52, an application running on the source device requests broadcast or multicast transmission, causing the device to request a traffic channel at 54. The process waits to determine if the central coordinator has sent an acknowledgement at 56. Meanwhile, at 541, the central coordinator receives the request. The central coordinator returns and acknowledgement to the source device at 542, received at the source device at 56. This is an acknowledgement of the request, not that the channel has been established, which may be referred to here as a channel acknowledgement. The traffic channel may be unidirectional or bi-directional. A unidirectional channel has a traffic flow only from the source device to the destination devices, and a bi-directional channel has a traffic flow in both directions.

If the time for awaiting the acknowledgement of the request at 56 is too long, the source device may retransmit the request. This determination is made at 561. If the decision to retransmit is made, the process returns to 52. If the decision is to not retransmit, the process moves to 602 and the request fails. If the acknowledgement of the request is received, the process then moves to 58 to await reply from the central coordinator as to whether the channel has been granted. The decision to re-transmit the request may be based upon expiration of a timer, or a predetermined request count being reached. The request may be re-transmitted until an event occurs, where the event may be a request acknowledgement being received, the timer expiring or the request count being reached.

During the time that the source device is waiting between receiving the request acknowledgement and the notification of channel grant or not, the central coordinator performs admission control and bandwidth allocation processes at 544. If the system can grant the channel at 544, the central coordinator informs the destination devices of the channel at 545 and replies with an affirmative channel grant at 546. At the source device, when the reply is received at 58, the device then determines that the channel has been granted at 60 and indicates the channel establishment status to the other layers in the source device.

If the channel is not granted at 544, the central coordinator sends a negative request response to the source device at 58. The determination that the channel was not granted is then made at 60. The device may decide to re-try the channel request at 601. If the device does not attempt to re-try the request, the request is indicated as failed at 602. Again, the decision to re-try may be based upon expiration of a timer or a predetermined re-try count being reached. The re-try process may be set to repeat until an event occurs, where the event is either a channel grant, expiration of the timer or a reaching a re-try count.

FIG. 4b shows an embodiment of a method to transmit data on a traffic channel. The process starts at 66. Initially, the source device determines whether a channel already exists at 68. If the channel exists, the source device then determines whether the channel is valid at 70. If the answer to either of these two questions is 'NO,' the process goes to the establish channel procedure, such as the one shown in FIG. 4a. If the channel exists and is valid, the process moves to the synchronization at 71, where the MAC layer achieves frequency and time synchronization and determines the position of the traffic channel within the frame. Once the device is synchronized, it transmits data to the destination devices and the central coordinator at 72.

In this embodiment, the central coordinator is used as a verifier to determine if the data has been successfully received. The destination devices receive the data at 721 and pass it to the relevant application on those devices at 722. In the case of a unidirectional channel, the destination devices do not explicitly acknowledge reception. The central coordinator also receives the data at 723, but does generate an acknowledgement at 724 and transmits it back to the source device at 725. As the traffic channel is unidirectional, this may be done on a dedicated channel (D-CH) or the beacon channel (B-CH). This acknowledgement may be referred to here as a data acknowledgement. This allows the source device to determine that the data was successfully received by at least one device in a unidirectional channel case, and therefore uses that to conclude that the data transmission was successful.

It is also possible that the channel established is a bi-directional channel. In this case, the data acknowledgement processes 724 and 725 may be performed by the central coordinator and any destination device that successfully received the data.

As part of the process of waiting for the acknowledgement at 73, the source device may also have a timer that is set to expire within a given time frame. If the timer expires, or an acknowledgement is received, the process moves to 74, where the success or failure of the transmission is determined. If the acknowledgement was received, the transmission was successful and that is sent back to the sending application on the device at 75. If the transmission was not successful at 74, the device either retransmits the data at 741, moving the process back to 68, or determines if there is more data to transmit at 76. If there is more data to transmit at 76, the process returns to 68. If there is no more data to transmit, the process moves to a release channel procedure, such as the one shown in FIG. 4c.

In FIG. 4c, the process to release the channel previously established starts at 78. The source device requests channel termination at 79. The central coordinator receives the request at 791 and generates and transmits the request acknowledgement at 792. The source device either receives the acknowledgement at 80, or a predetermined time period expires. If the acknowledgement is not received, the source device decides whether to retransmit the request at 801, which either moves the process back to 79 or fails the request at 822. If the acknowledgement is received at 80, the source device moves to a waiting state at 81.

At the central coordinator, the channel is either terminated or not at 793. If it is terminated, the destination devices are informed at 794 and the affirmative reply to the request is sent at 795. The affirmative reply is received at 81, and the determination that the channel has been released is made at 82. The release status is then indicated back to the relevant applications on the source device at 83 and the process ends at 84.

If the channel is not terminated at 793, a negative reply is sent to the source device at 796. The determination is then made that the channel has not been released at 82. The device then determines whether it should re-try at 821, sending the process back to 79, or fail the request at 822. If the request fails at 822, the process then ends at 84.

Figure 5:
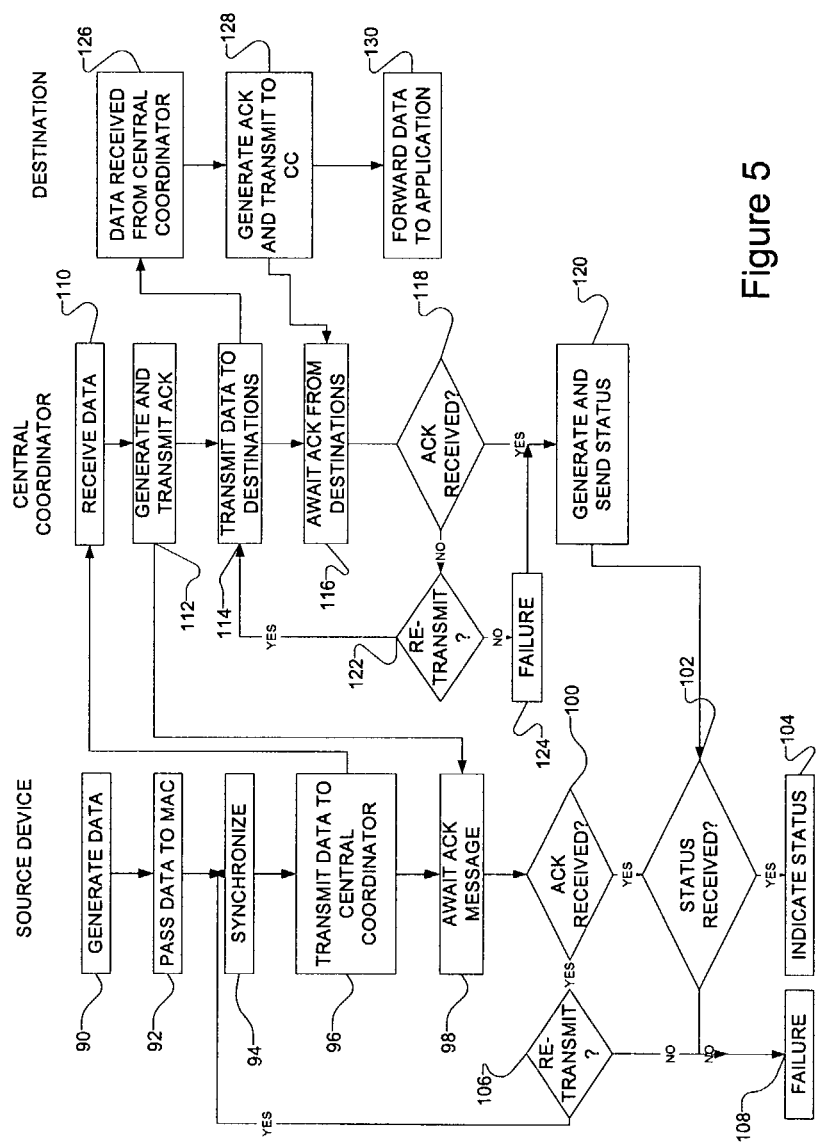
FIG. 5 shows a flowchart of an alternative method of transmitting data in a centralized network.

In another alternative method, referred to here as the dedicated relay method, the method assumes that every device has a bi-directional D-CH channel between the central coordinator and the device. A flowchart of an embodiment of this method is shown in FIG. 5, with the focus being mostly on the central coordinator. The D-CH channels and bandwidth allocations to these channels are established when the device is first admitted to the network and remain active as long as the device is a part of the network.

As discussed above with regard to FIGS. 4a-c, an application on the device generates data at 90 and passes it to the MAC layer at 92. The MAC layer then synchronizes and transmits the data to the central coordinator at 96, waiting for the acknowledgment at 98. Similar processes for determining if the acknowledgment is received at 100, and whether or not to re-transmit at 106 also occur. Once the acknowledgment is received, the source device then waits for a status report from the central coordinator at 102. If the status is received at 102, the MAC layer then reports the status to the application at 104. If the status is not received, the process fails at 108.

Different from the previous methods the source device transmits the data over the D-CH to be received by the central coordinator at 110, identifying the group of destinations for the data. When the central coordinator receives the data over the D-CH, it acknowledges the successful receipt of the data over the D-CH at 112. At 114, the central coordinator transmits the data to the identified group of destinations at 114. The central coordinator then waits for acknowledgments from each destination device at 116. If the acknowledgments are received at 118, the central coordinator generates a status report and sends it to the source device. If no acknowledgment is received in the proper amount of time or re-transmission, the central coordinator may decide to re-transmit at 122, returning the process to transmission at 114, or note it as a failure at 124. If the transmission fails, this is then reported as the status at 120. The status may take the form of the universal acknowledgement mentioned with reference to FIG. 3.

At the destination device, the data is received on each device's respective dedicated channel between it and the central coordinator at 126. Each destination then transmits an acknowledgment to the central coordinator at 128. While the central coordinator and source device continue to communicate, the destination device forwards the data to the application for which it was intended at 130 and returns to normal operations.

Figure 6:
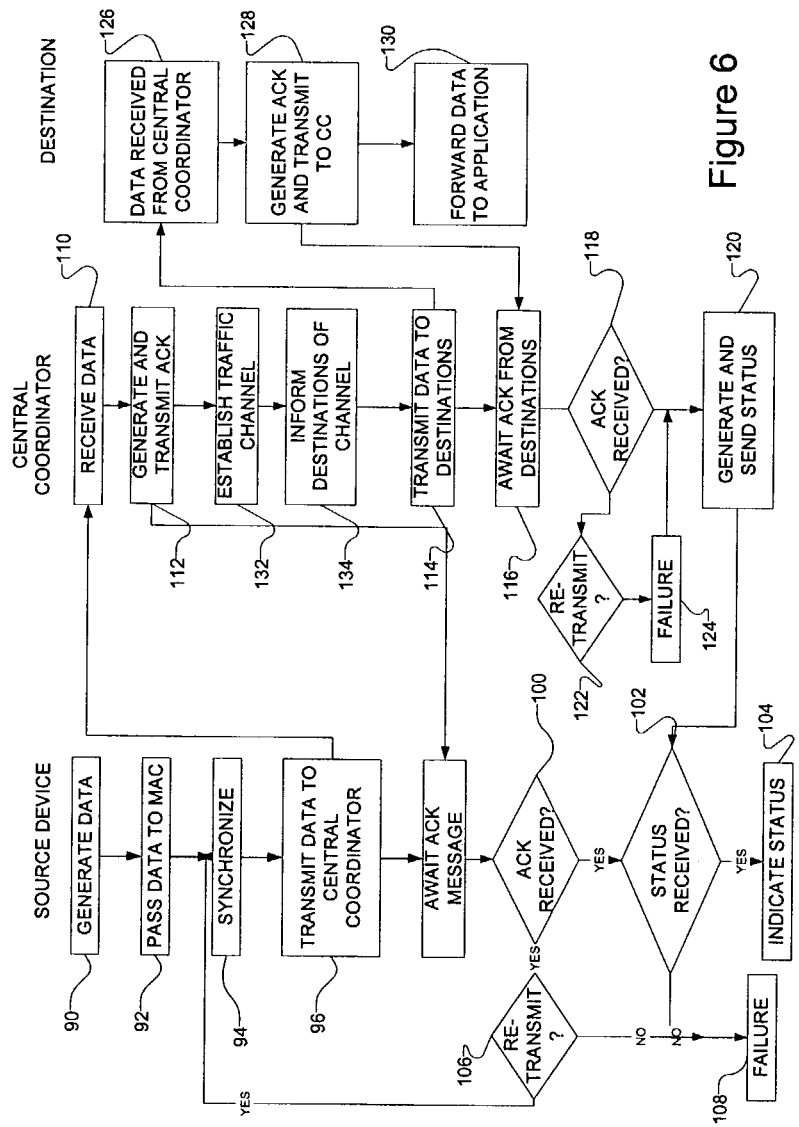
FIG. 6 shows a flowchart of an alternative method of transmitting data in a centralized network.

In an alternative relay method, shown in FIG. 6 and referred to here as the dual channel relay method, the process is very similar to that of the dedicated relay method, with the focus again being on the central coordinator. The source device transmits the data to the central coordinator at 96, in this case over either the dedicated channel or an already established traffic channel between the source device and the CC. When the central coordinator transmits its acknowledgment to the source device it uses the same channel. For example, if the data is received on the dedicated channel, the acknowledgment is transmitted on the dedicated channel.

The transmission and waiting processes on the source device are otherwise very similar to those of the dedicated relay method and will therefore not be addressed again here. One of the main differences between the dual channel relay method and the previously discussed dedicated relay method occurs at the central coordinator. Once the acknowledgment of the data is generated, the central coordinator then establishes a point to multi-point traffic channel at 132 and informs all of the destinations of the channel at 134. In an alternative embodiment the central coordinator may establish individual, point-to-point traffic channels between it and each device. The data transmission that occurs at 114, as well as the data reception at 126, may happen over the traffic channel, rather than the dedicated channel. The acknowledgment may occur over the dedicated channel between the destination device and the central coordinator. The process continues on all three entities in a manner similar to the operations in the dedicated relay method, and is unnecessary to repeat here.

The dual channel relay method may have several different combinations of channels for acknowledgements and data transmission. The central coordinator may send data over a dedicated channel, a point-to-point traffic channel, or a point-to-multipoint traffic channel. Similarly, the destinations may acknowledge reception of the data on a point-to-point traffic channel, or the point-to-point dedicated channel between each device and the central coordinator. The central coordinator may then communicate with the source device on a point-to-point traffic channel or the point-to-point dedicated channel.

Having discussed four different methods to transmit data, a means to evaluates them for broadcast/multicast and determine an "optimal" method becomes useful. Optimality is defined here will be from both a network perspective and from an application perspective. From the network perspective, a broadcast/multicast transmission is said to be optimal if the bandwidth required, as defined as number of symbols, for successfully transmission is minimum. From the application perspective, a broadcast/multicast transmission is said to be optimal if the delay is minimized.

As discussed above, time is assumed to be slotted and slots are organized into a Frame. Bandwidth allocations to a channel include the slots within a frame and the frequencies/tones the channel can use. The allocation also includes the duration for which the channel might use these slots/tones. Several parameters will be used in analyzing the discussed methods, as defined below.

$L_{pkt}$: The length of the packet or burst that needs to be transmitted.

$L_{req}$: The length of the request and response messages used to establish a Traffic Channel.

$P_{win}$: Probability of successful transmission using the Contention Channel.

EI: Equipment Identifier is a globally unique identifier for all devices in the network.

TI: Tone Identifier is a globally unique identifier for each tone or carrier in a multi-tone system such as OFDM.

$T_{frame}$: Duration of a Time Frame.

$T_{symbol}$: Duration of a single symbol.

M: Multicast set defined as the set of EIs of the destination devices that are the intended recipients of the multicast message transmission.

Br: Broadcast set defined as the set of EIs of the all active devices in the network, except the source of transmission.

i: Variable used to denote source EIs. The variable i can take the EI value of any active device in the network.

j: Variable used to denote destination EIs. The variable i can take the EI value of any active device in the network. The variable j can also take on the value M to denote a multicast set of recipients or Br to denote a broadcast set of destination EIs. The variable j takes the value central coordinator when the destination is the CC.

k: Variable used to denote a Tone Identifier (TI).

l: Variable used to denote the type of channel. The variable l can take the values D-CH, T-CH, C-CH to denote Dedicated Channel, Traffic Channel and Contention Channel respectively.

$B_{min}$: Minimum modulation density defined as bits/symbol supported by the physical transmission system.

$B_{max}$: Maximum modulation density defined as bits/symbol supported by the physical transmission system.

$A^{i,j,l}$: Allocation or bandwidth assignment to a particular channel. $A^{i,j,l}$ is a data structure with the following information elements:

$$A^{i,j,l} = \begin{cases} i, EI \text{ of the Source Device} \\ j, EIs \text{ of the Destination Devices} \\ \quad j = M \text{ for multicast set, } j = Br \text{ for Broadcast set,} \\ \quad j = CC \text{ for Central Coordinator} \\ l, \text{Type of channel} \\ \quad l = DC \text{ for Dedicated Channel} \\ \quad l = TC \text{ for Traffic Channel} \\ \quad l = CCh \text{ for Contention Channel} \\ T_{alloc}, \text{Duration of the allocation within a Frame} \\ \Phi^{i,j,l}, \text{Set of } TIs \text{ identifying tones used by} \\ \quad \text{channel } l \text{ in allocation } A^{i,j,l} \\ N^{i,j,l}_{tones}, \text{Number of tones on the set } \Phi^{i,j,l} \\ B^{i,j,l}_k, \text{Modulation density on tone } k \text{ in allocation } A^{i,j,l} \\ B^{i,j,l} = \{B^{i,j,l}_k\}, \text{Set of modulation density } B^{i,j,l}_k \text{ on} \\ \quad \text{all Tones/Carriers to be used by} \\ \quad \text{source device } i \text{ in allocation } A^{i,j,l} \end{cases}$$

The optimality of each method will be determined by at least one parameter of merit. A first parameter of merit is the delay. This is defined as the delay ($D_{method}$) incurred in successful transmission of a packet of length $L_{pkt}$ from a source device to all intended destination devices, which might be a single device identified by EIj, or a set of EIs of devices defined by the Multicast set M or the set of EIs of all devices in the network defined by the Broadcast set Br.

A second parameter of merit is the Bandwidth ($BW_{method}$) in symbols required for successful transmission of a packet of length $L_{pkt}$ from a source device to all intended destination devices, which might be a single device identified by EIj, or a set of EIs of devices defined by the Multicast set M or the set of EIs of all devices in the network defined by the Broadcast set Br. Each method has a different computation to determine the bandwidth. The determination of the merit parameters may differ for each of the four transmission methods discussed above: the contention access method; the direct broadcast method; the direct relay method and the dual channel relay methods. In addition the determination of the merit parameter may differ within each method based upon the nature of the transmission, either broadcast or multicast transmission. For contention access broadcast transmissions, the bandwidth required and delay incurred are given by:

$$BW_1^{Br} = \frac{1}{P_{win}} \times \left\lceil \frac{L_{pkt}}{N_{tones} \times B_{min}} \right\rceil \times N_{tones}$$

$$D_1^{Br} = \frac{1}{P_{win}} \times \left( T_{frame} + T_{symbol} \times \left\lceil \frac{L_{pkt}}{N_{tones} \times B_{min}} \right\rceil \right)$$

For multicast transmissions, the bandwidth required in symbols and delay incurred are given by:

$$BW_1^M = BW_1^{Br}$$

$$D_1^M = D_1^{Br}$$

For the direct broadcast method, broadcast transmissions the bandwidth required and delay incurred are given by:

$$BW_2^{Br} = \left\lceil \frac{L_{pkt}}{\sum_{k \in \Phi^{i,Br,TC}} B_k^{i,Br,TC}} \right\rceil \times N_{tones}^{i,Br,TC} + 2 * \left\lceil \frac{L_{req}}{\sum_{k \in \Phi^{i,CC,DC}} B_k^{i,CC,DC}} \right\rceil * N_{tones}^{i,CC,DC}$$

$$D_2^{Br} = \frac{T_{frame}}{2} + T_{symbol} \times \left\lceil \frac{L_{pkt}}{\sum_{k \in \Phi^{i,Br,TC}} B_k^{i,Br,TC}} \right\rceil$$

For multicast transmissions, the bandwidth required in symbols and delay incurred are given by:

$$BW_2^M = \left\lceil \frac{L_{pkt}}{\sum_{k \in \Phi^{i,N,TC}} B_k^{i,M,TC}} \right\rceil \times N_{tones}^{i,M,TC} + 2 * \left\lceil \frac{L_{req}}{\sum_{k \in \Phi^{i,CC,DC}} B_k^{i,CC,DC}} \right\rceil * N_{tones}^{i,CC,DC}$$

$$D_2^M = T_{frame} + T_{symbol} \times \left\lceil \frac{L_{pkt}}{\sum_{k \in \Phi^{i,M,TC}} B_k^{i,M,TC}} \right\rceil$$

For dedicated relay broadcast transmissions, the bandwidth required and delay incurred are given by:

$$BW_3^{Br} = \left\lceil \frac{L_{pkt}}{\sum_{k \in \Phi^{i,CC,DC}} B_k^{i,CC,DC}} \right\rceil \times N_{tones}^{i,CC,DC} + \sum_{j \in Br} \left( \left\lceil \frac{L_{pkt}}{\sum_{k \in \Phi^{CC,j,DC}} B_k^{CC,j,DC}} \right\rceil \times N_{tones}^{CC,j,DC} \right)$$

The dedicated channel for each device might consist of a single tone operational throughout the time frame, or it might be multiple tones operating only in the time period $T_{alloc}$ within the frame. Therefore the delay is then given by:

If $T_{alloc} \geq T_{symbol} \times \left\lceil \frac{L_{pkt}}{\sum_{k \in \Phi^{i,CC,DC}} B_k^{i,CC,DC}} \right\rceil$ then, $$D_3^{Br} = T_{symbol} \times \left\lceil \frac{L_{pkt}}{\sum_{k \in \Phi^{i,CC,DC}} B_k^{i,CC,DC}} \right\rceil + \underset{j \in Br}{\text{Max}} \left( \left\lceil \frac{L_{pkt}}{\sum_{k \in \Phi^{CC,j,DC}} B_k^{CC,j,DC}} \right\rceil \times T_{symbol} \right)$$

Else, $$D_3^{Br} = \frac{T_{frame}}{2} + \left\lceil \frac{T_{symbol} \times \left\lceil \frac{L_{pkt}}{\sum_{k \in \Phi^{i,CC,DC}} B_k^{i,CC,DC}} \right\rceil}{T_{alloc}} \right\rceil \times T_{frame} +$$

$$T_{symbol} \times \left\lceil \frac{L_{pkt}}{\sum_{k \in \Phi^{i,CC,DC}} B_k^{i,CC,DC}} \right\rceil +$$

$$\underset{j \in Br}{\text{Max}} \left( \left\lceil \frac{T_{symbol} \times \left\lceil \frac{L_{pkt}}{\sum_{k \in \Phi^{CC,j,DC}} B_k^{CC,j,DC}} \right\rceil}{T_{alloc}} \right\rceil \times T_{frame} + \right.$$

$$\left. \underset{j \in Br}{\text{Max}} \left( \left\lceil \frac{L_{pkt}}{\sum_{k \in \Phi^{CC,j,DC}} B_k^{CC,j,DC}} \right\rceil \times T_{symbol} \right) \right)$$

For multicast transmissions, the bandwidth required in symbols and delay incurred are given by:

$$BW_3^M = \left\lceil \frac{L_{pkt}}{\sum_{k \in \Phi^{i,CC,DC}} B_k^{i,CC,DC}} \right\rceil \times N_{tones}^{i,CC,DC} + \sum_{j \in M} \left( \left\lceil \frac{L_{pkt}}{\sum_{k \in \Phi^{CC,j,DC}} B_k^{CC,j,DC}} \right\rceil \times N_{tones}^{CC,j,DC} \right)$$

The Dedicated Channel for each device might consist of a single tone operational throughout the time frame, or it might be multiple tones operating only in the time period $T_{alloc}$ within the frame. Therefore the delay is then given by:

If $T_{alloc} \geq T_{symbol} \times \left\lceil \frac{L_{pkt}}{\sum_{k \in \Phi^{i,CC,DC}} B_k^{i,CC,DC}} \right\rceil$ then, $$D_3^{Br} = \frac{T_{frame}}{2} + T_{symbol} \times \left\lceil \frac{L_{pkt}}{\sum_{k \in \Phi^{i,CC,DC}} B_k^{i,CC,DC}} \right\rceil + \operatorname*{Max}_{j \in M}\left(\left\lceil \frac{L_{pkt}}{\sum_{k \in \Phi^{CC,j,DC}} B_k^{CC,j,DC}} \right\rceil \times T_{symbol}\right)$$

Else, $$D_3^{Br} = \frac{T_{frame}}{2} + \left\lceil \frac{T_{symbol} \times \left\lceil \frac{L_{pkt}}{\sum_{k \in \Phi^{i,CC,DC}} B_k^{i,CC,DC}} \right\rceil}{T_{alloc}} \right\rceil \times T_{frame} +$$

$$T_{symbol} \times \left\lceil \frac{L_{pkt}}{\sum_{k \in \Phi^{i,CC,DC}} B_k^{i,CC,DC}} \right\rceil +$$

$$\operatorname*{Max}_{j \in Br}\left(\left\lceil \frac{T_{symbol} \times \left\lceil \frac{L_{pkt}}{\sum_{k \in \Phi^{CC,j,DC}} B_k^{CC,j,DC}} \right\rceil}{T_{alloc}} \right\rceil \times T_{frame} + \operatorname*{Max}_{j \in M}\left(\left\lceil \frac{L_{pkt}}{\sum_{k \in \Phi^{CC,j,DC}} B_k^{CC,j,DC}} \right\rceil \times T_{symbol}\right)\right)$$

For dual channel relay broadcast transmissions, the bandwidth required and delay incurred are given by:

$$BW_4^{Br} = \left\lceil \frac{L_{pkt}}{\sum_{k \in \Phi^{i,CC,DC}} B_k^{i,CC,DC}} \right\rceil \times N_{tones}^{i,CC,DC} + \left\lceil \frac{L_{pkt}}{\sum_{k \in \Phi^{CC,Br,DC}} B_k^{CC,Br,TC}} \right\rceil \times N_{tones}^{CC,Br,TC}$$

The Dedicated Channel for each device might consist of a single tone operational throughout the time frame, or it might be multiple tones operating only in the time period $T_{alloc}$ within the frame. Therefore the delay is then given by:

If $T_{alloc} \geq T_{symbol} \times \left\lceil \frac{L_{pkt}}{\sum_{k \in \Phi^{i,CC,DC}} B_k^{i,CC,DC}} \right\rceil$ then, $$D_4^{Br} = T_{symbol} \times \left\lceil \frac{L_{pkt}}{\sum_{k \in \Phi^{i,CC,DC}} B_k^{i,CC,DC}} \right\rceil + T_{symbol} \times \left\lceil \frac{L_{pkt}}{\sum_{k \in \Phi^{CC,BR,DC}} B_k^{CC,Br,TC}} \right\rceil + \frac{T_{frame}}{2}$$

Else, $$D_4^{Br} = \frac{T_{frame}}{2} + \left\lceil \frac{T_{symbol} \times \left\lceil \frac{L_{pkt}}{\sum_{k \in \Phi^{i,CC,DC}} B_k^{i,CC,DC}} \right\rceil}{T_{alloc}} \right\rceil \times T_{frame} +$$

$$T_{symbol} \times \left\lceil \frac{L_{pkt}}{\sum_{k \in \Phi^{i,CC,DC}} B_k^{i,CC,DC}} \right\rceil + T_{symbol} \times \left\lceil \frac{L_{pkt}}{\sum_{k \in \Phi^{CC,BR,DC}} B_k^{CC,Br,TC}} \right\rceil$$

For multicast transmissions, the bandwidth required in symbols is given by:

$$BW_4^M = \left\lceil \frac{L_{pkt}}{\sum_{k \in \Phi^{i,CC,DC}} B_k^{i,CC,DC}} \right\rceil \times N_{tones}^{i,CC,DC} + \left\lceil \frac{L_{pkt}}{\sum_{k \in \Phi^{CC,M,DC}} B_k^{CC,M,TC}} \right\rceil \times N_{tones}^{CC,M,TC}$$

For multicast transmissions, the delay symbols incurred in completing the multicast is given by:

If $T_{alloc} \geq T_{symbol} \times \left\lceil \frac{L_{pkt}}{\sum_{k \in \Phi^{i,CC,DC}} B_k^{i,CC,DC}} \right\rceil$ then, $$D_4^M = T_{symbol} \times \left\lceil \frac{L_{pkt}}{\sum_{k \in \Phi^{i,CC,DC}} B_k^{i,CC,DC}} \right\rceil + T_{symbol} \times \left\lceil \frac{L_{pkt}}{\sum_{k \in \Phi^{CC,M,DC}} B_k^{CC,M,TC}} \right\rceil + \frac{T_{frame}}{2}$$

Else, $$D_4^M = \frac{T_{frame}}{2} + \left\lceil \frac{T_{symbol} \times \left\lceil \frac{L_{pkt}}{\sum_{k \in \Phi^{i,CC,DC}} B_k^{i,CC,DC}} \right\rceil}{T_{alloc}} \right\rceil \times T_{frame} +$$

$$T_{symbol} \times \left\lceil \frac{L_{pkt}}{\sum_{k \in \Phi^{i,CC,}} B_k^{i,CC,DC}} \right\rceil + T_{symbol} \times \left\lceil \frac{L_{pkt}}{\sum_{k \in \Phi^{CC,M,DC}} B_k^{CC,M,TC}} \right\rceil$$

With these parameters of merit defined, it is now possible to determine an optimal method of transmission. Governing this decision are some simple rules. If a device needs to transmit a single burst or packet, then the device uses the following algorithm to choose and compute the optimality metric. If a device wishes to do continuous broadcasts or multicasts, the same algorithm is used to determine the optimal method and this method is used for all the broadcast/multicast transmission, until key parameters such as the allocations to the T-CH or D-CH or the $P_{win}$ parameter of the C-CH change. In the event of such a change, the device or the central coordinator may re-compute the metrics and change the method if the current method proves sub-optimal.

The decision on the optimal method may be made either by the central coordinator or by the source device. In either case, both the device and central coordinator must have all the information required to make the decision. A flowchart of one embodiment of making such a decision is shown in FIG. 7. The first stage in the process is the exchange of relevant information between the central coordinator and the source device, which includes all parameters defined above that are used in the computation of the parameters of merit. These defined parameters will be referred to as the system parameters.

As can be seen in FIG. 7, the source device desiring transmission will inform the central coordinator of the intended devices for the transmission, such as all devices for broadcast, or a defined group for a multicast at 140. At 142 the source device obtains the system parameters, such as $P_{win}$, the allocations $A^{i,CC,D-CH}$ for Dedicated Channels from all devices (i) in the system, and a specific Traffic Channel allocation $A^{i,Br/M,T-CH}$. The source device uses a local parameter at 144 such as the length of the packet, the length of a burst, if a burst is used instead of a packet, and the length of the request and response messages used to establish the Traffic Channel. The source device also uses the information obtained from the central coordinator to compute the delay and bandwidth figures of merit as defined above. If the central coordinator is making the decision, this information is communicated to the CC.

The relevant merit parameter is then determined at 144. Which parameter is used is determined by the transmission requirements at 150. For example, if the source device needs to successfully transmit the packet to all destination devices in minimum time then the device chooses the method that has the lowest Delay parameter of merit. The delay parameter is computed for all four methods at 152 and the one with the lowest delay is selected at 146.

If the network chooses to minimize the amount of bandwidth in symbols that would be required for the packet transmission, the bandwidth figure of merit is computed for all methods by the device or the central coordinator at 154 and the method with the least bandwidth value is chosen for the broadcast/multicast transmission at 146. Unless the allocations defined above change, the device will continue to use the same method for broadcast/multicast as determined in by the appropriate parameter of merit.

These methods and processes may be implemented in software or hardware in the respective devices. A block diagram of an embodiment of a device is shown in FIG. 8. As mentioned above, any device may act as the central coordinator that has the processing capability. The device 160 has a processor 164. In an alternative embodiment the device has two such processors. Within the processor 160 is the protocol stack 164, which includes software instructions to implement the transport, MAC and physical layers, as well as the connection manager (CM). When the device is acting as the central coordinator, the software that implements the CBWM is active. When the device is not the central coordinator, the CBWM is inactive.

In addition to the processor or processors, other hardware components are made available for the MAC, transport and physical layer functions. This hardware may include memory registers, field programmable gate arrays (FPGAs), application specific integrated circuits (ASICs), etc. The specific architecture and implementation of these components and their functions are left to the system designer. The device communicates through an array of ports, from port 1 172 to port N 174, where the exact number of ports is also left to the system designer.

In the instance where the methods of the invention are implemented in software in a pre-existing device with the necessary hardware capabilities and capacity, the software may take the form of an article of machine-readable media. Software code resides on the media, and when executed by the processor, the software causes the machine or device to perform the processes and methods of the invention.

Thus, although there has been described to this point a particular embodiment for a method and apparatus for transmitting data in a centralized network, it is not intended that such specific references be considered as limitations upon the scope of this invention except in-so-far as set forth in the following claims.

What is claimed is:

1. In a power line data transmission network, a method of determining a process for transmitting data on said network, the method comprising:
    notifying a central coordinator of a group of devices to receive a transmission;
    obtaining system parameters from the central coordinator, wherein the system parameters include a bandwidth merit parameter and a delay merit parameter;
    determining whether (a) to transmit a packet in minimum time or (b) to minimize the amount of bandwidth for the packet;
    if it is determined to transmit the packet in minimum time:
        computing the delay merit parameter for a contention access method of transmitting data, a direct broadcast method of transmitting data, a dedicated relay method of transmitting data, and a dual channel relay method of transmitting data; and
        selecting a method of transmitting data on said network, the transmission method selected being from the group consisting of (a) the contention access method, (b) the direct broadcast method, (c) the dedicated relay method, and (d) the dual channel relay method, said selection being based upon said computed delay merit parameter;
    if it is determined to minimize the amount of bandwidth for the packet:
        computing the bandwidth merit parameter for the contention access method of transmitting data, the direct broadcast method of transmitting data, the dedicated relay method of transmitting data, and the dual channel relay method of transmitting data; and
        selecting a method of transmitting data on said network, the transmission method selected being from the group consisting of (a) the contention access method, (b) the direct broadcast method, (c) the dedicated relay method, and (d) the dual channel relay method, said selection being based upon said computed bandwidth merit parameter; and
    transmitting data to said group of devices utilizing said selected method.

2. The method of claim 1 wherein obtaining system parameters further comprises obtaining at least one of the groups comprised of: a probability of transmission of a packet using a contention channel, allocation for any dedicated channels, and a traffic channel allocation.

3. The method of claim 1, the method further comprising setting the method of transmission selected as a default method of transmission.

4. The method of claim 1, wherein:
    the contention access method of transmitting data uses a contention channel associated with the power line communications network;
    the direct broadcast method of transmitting data uses a point-multipoint traffic channel associated with the power line communications network;
    the dedicated relay method of transmitting data uses a bi-directional direct channel associated with the power line communications network;
    the dual channel relay method of transmitting data uses at least one of a dedicated channel and a traffic channel associated with the power line communications network; and
    if it is determined to transmit the packet in minimum time, said selection being based upon the delay merit parameter having the lowest computed delay from among the four different methods of transmitting data.

5. The method of claim 4, wherein:
    selecting a method of transmission further comprises selecting the method of transmission with the lowest delay merit parameter.

6. The method of claim 1, wherein:
    the contention access method of transmitting data uses a contention channel associated with the power line communications network;

the direct broadcast method of transmitting data uses a point-multipoint traffic channel associated with the power line communications network;

the dedicated relay method of transmitting data uses a bi-directional direct channel associated with the power line communications network;

the dual channel relay method of transmitting data uses at least one of a dedicated channel and a traffic channel associated with the power line communications network; and if it is determined to minimize the amount of bandwidth for the packet, said selection being based upon the bandwidth merit parameter having the lowest computed bandwidth from among the four different methods of transmitting data.

7. The method of claim 6, wherein:

selecting a method of transmission further comprises selecting the method of transmission with the lowest bandwidth merit parameter.

8. A device, comprising:

a port to allow the device to communicate with a centralized power line communications network;

a processor configured to:

notify a central coordinator of a group of devices to receive a transmission;

obtain system parameters from the central coordinator, wherein the system parameters include a bandwidth merit parameter and a delay merit parameter;

determine whether (a) to transmit a packet in minimum time or (b) to minimize the amount of bandwidth for the packet;

responsive to determining to transmit the packet in minimum time:

compute the delay merit parameter for a contention access method of transmitting data, a direct broadcast method of transmitting data, a dedicated relay method of transmitting data, and a dual channel relay method of transmitting data; and select a method of transmitting data on said network, the transmission method selected being from the group consisting of (a) the contention access method, (b) the direct broadcast method, (c) the dedicated relay method, and (d) the dual channel relay method, said selection being based upon said computed delay merit parameter; responsive to determining to minimize the amount of bandwidth for the packet:

compute the bandwidth merit parameter for the contention access method of transmitting data, the direct broadcast method of transmitting data, the dedicated relay method of transmitting data, and the dual channel relay method of transmitting data; and select a method of transmission based upon the merit parameter, the transmission method selected being from the group consisting of (a) the contention access method, (b) the direct broadcast method, (c) the dedicated relay method, and (d) the dual channel relay method, said selection being based upon said computed bandwidth merit parameter; and transmit data to said group of devices utilizing said selected method.

9. The device of claim 8, at least one system parameter further comprising one selected from the group comprised of: a probability of transmission of a packet using a contention channel, allocation for any dedicated channels, and a traffic channel allocation.

10. The device of claim 8, the device further comprising a connection manager.

11. The device of claim 8, wherein:

the contention access method of transmitting data uses a contention channel associated with the power line communications network;

the direct broadcast method of transmitting data uses a point-multipoint traffic channel associated with the power line communications network;

the dedicated relay method of transmitting data uses a bi-directional direct channel associated with the power line communications network;

the dual channel relay method of transmitting data uses at least one of a dedicated channel and a traffic channel associated with the power line communications network; and responsive to determining to transmit the packet in minimum time, said processor configured to select the delay merit parameter having the lowest computed delay from among the four different methods of transmitting data.

12. The device of claim 8, wherein:

the contention access method of transmitting data uses a contention channel associated with the power line communications network;

the direct broadcast method of transmitting data uses a point-multipoint traffic channel associated with the power line communications network;

the dedicated relay method of transmitting data uses a bi-directional direct channel associated with the power line communications network;

the dual channel relay method of transmitting data uses at least one of a dedicated channel and a traffic channel associated with the power line communications network; and responsive to determining to minimize the amount of bandwidth for the packet, said processor configured to select the bandwidth merit parameter having the lowest computed bandwidth from among the four different methods of transmitting data.

13. An article of non-transitory machine-readable media containing code that, when executed, causes a machine to:

notify a central coordinator of a group of units connected in a power line communications network to receive a transmission;

obtain system parameters from the central coordinator, wherein the system parameters include a bandwidth merit parameter and a delay merit parameter;

determine whether (a) to transmit a packet in minimum time or (b) to minimize the amount of bandwidth for the packet;

responsive to determining to transmit the packet in minimum time:

compute the delay merit parameter for a contention access method of transmitting data, a direct broadcast method of transmitting data, a dedicated relay method of transmitting data, and a dual channel relay method of transmitting data; and select a method of transmitting data on said network, the transmission method selected being from the group consisting of (a) the contention access method, (b) the direct broadcast method, (c) the dedicated relay method, and (d) the dual channel relay method, said selection being based upon said computed delay merit parameter; responsive to determining to minimize the amount of bandwidth for the packet:

compute the bandwidth merit parameter for the contention access method of transmitting data, the direct broadcast method of transmitting data, the dedicated relay method of transmitting data, and the dual channel relay method of transmitting data; and select a method for transmitting data in said network based upon the merit parameter, the transmission method selected being from the group consisting of (a) the contention access method, (b) the direct broadcast method, (c) the dedicated relay method, and (d) the dual channel relay method, said selection being based upon said computed bandwidth merit parameter; and transmit data to said group of units utilizing said selected method.

14. The article of claim 13, the code, when executed, further causing the machine to set the method of transmission selected as a default method of transmission.

15. The article of claim 13, wherein:

the contention access method of transmitting data uses a contention channel associated with the power line communications network;

the direct broadcast method of transmitting data uses a point-multipoint traffic channel associated with the power line communications network;

the dedicated relay method of transmitting data uses a bi-directional direct channel associated with the power line communications network;

the dual channel relay method of transmitting data uses at least one of a dedicated channel and a traffic channel associated with the power line communications network; and responsive to determining to transmit the packet in minimum time, the code, when executed, further causing the machine to select the delay merit parameter having the lowest computed delay from among the four different methods of transmitting data.

16. The article of claim 13, wherein:

the contention access method of transmitting data uses a contention channel associated with the power line communications network;

the direct broadcast method of transmitting data uses a point-multipoint traffic channel associated with the power line communications network;

the dedicated relay method of transmitting data uses a bi-directional direct channel associated with the power line communications network;

the dual channel relay method of transmitting data uses at least one of a dedicated channel and a traffic channel associated with the power line communications network; and responsive to determining to minimize the amount of bandwidth for the packet the code, when executed, further causing the machine to select the bandwidth merit parameter having the lowest computed bandwidth from among the four different methods of transmitting data.

* * * * *